United States Patent Office 3,519,843
Patented July 7, 1970

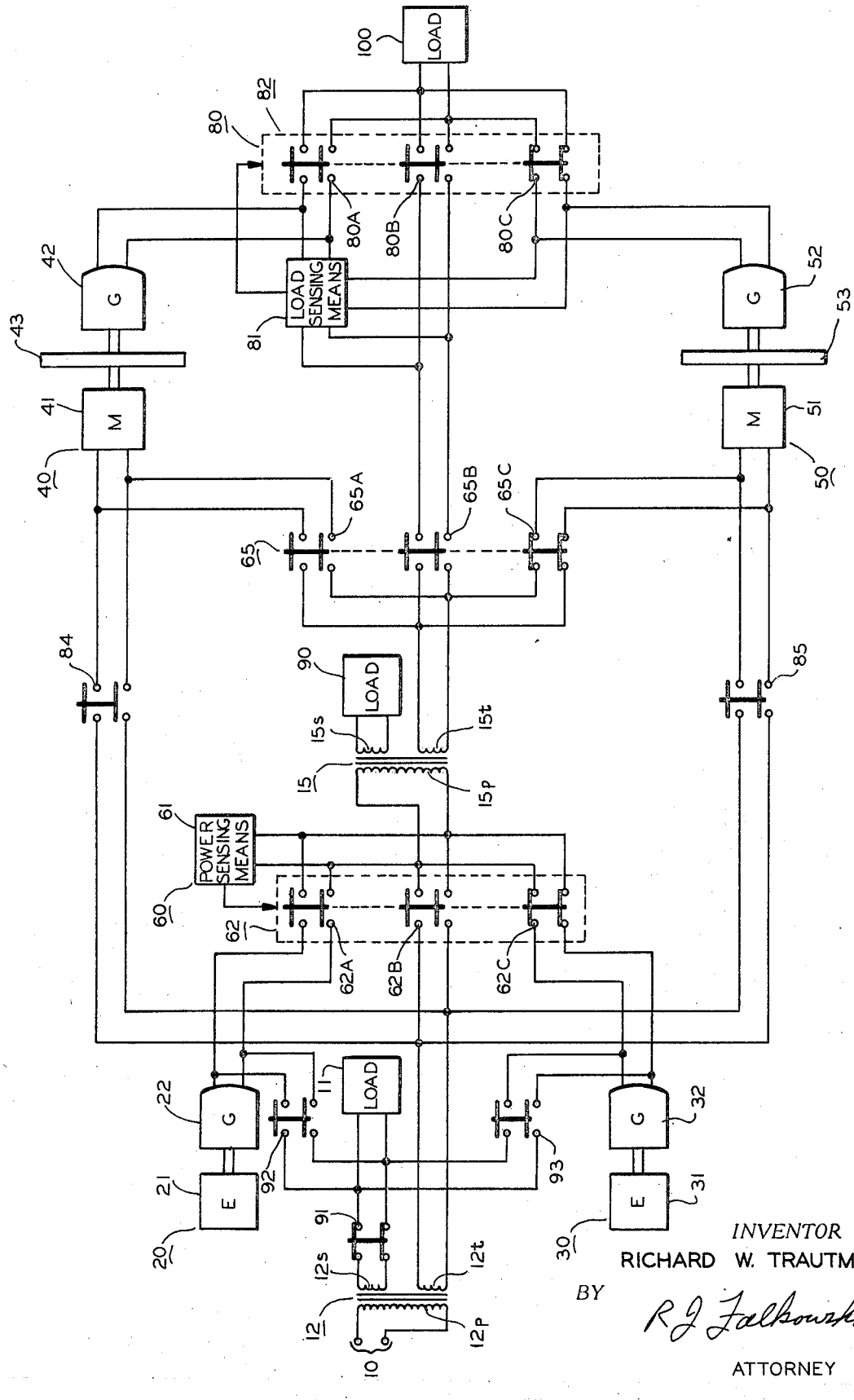

3,519,843
ELECTRICAL POWER SUPPLY SYSTEM
Richard W. Trautman, Buchanan, Mich., assignor to Clark Equipment Company, a corporation of Michigan
Filed Nov. 17, 1967, Ser. No. 683,876
Int. Cl. H02j 9/00
U.S. Cl. 307—65     4 Claims

ABSTRACT OF THE DISCLOSURE

An electrical power supply system has a critical load energized from a selected one of two motor-generator units. The electrical power for the operating motor-generator unit is obtainable from either one of two engine-generator units or from an alternate supply, the normal utility service. Either of the engine-generator units is used to furnish normal operating power for the critical load. A control means is responsive to the engine-generator output to connect the utility source to furnish the required power upon failure of the operating engine-generator unit.

---

This invention relates to electrical power systems, particularly to alternating current electrical power systems that furnish substantially continuous, refined power without any significant probability of interruption.

It is desirable and often practically necessary that certain types of critical electrical loads, such as computer or data processing centers, missle control centers, or satellite launch centers receive electrical power from power supplies that are virtually continuous with practically no probability of power interruption or significant fluctuation. To accomplish this goal several types of standby power supply systems have been developed. Some power systems use electronic standby units that sense the failure of a normal power supply and turn on to continue supplying the load from a battery powered inverter. These systems are designed to operate without producing significant variation in power delivered to the load and without producing any transients that could adversely affect the load. Most operate only for a short period of time to furnish power until another source, such as an engine-generator unit, has become operative. There are several variations of these systems, but all are relatively complex and expensive, and require a relatively large installation area.

Other systems use moto-generator units with a battery powered direct current motor on the same shaft as the motor of the motor-generator unit to continue rotating the motor until an alternate power supply is operative.

Whichever system is used, there has always been one basic approach to the problem whenever an electrical utility power source is included for use in the system, that is, utilizing the utility power source as the primary power source and having standby generating equipment available that can be placed in operation upon failure of the utility source. This approach always entailed means for supplying the load until the standby source became operative.

With this invention, a new method of supplying a critical load and a means for providing a high reliability electrical power system uses a prime mover electrical generating means for energizing a high inertia mass electrically driven generating means that energizes the critical load with refined, substantially invariable, power. The optimum system uses two prime mover generating means with two electrically driven generating means so that one of each may be maintained while the other is in operation. If the prime mover generating means fails, a utility power source is utilized at the standby source and is connected to energize the electrically driven generating means. The period of time required to accomplish the switching to the utility source, even with relatively unsophisticated switching equipment, is short enough to maintain the electrical characteristics of the supply without transients or significant variations in frequency occurring because of the inertial mass of the electrically driven generating means. Considering all the factors involved in furnishing refined and substantially uninterruptable owner, a power system according to this invention has a higher overall reliability relative to overall cost than similar systems.

The objects of this invention are to provide a new and improved highly reliable power suppply system, to provide a power supply system having a high reliability probability at a minimum cost, to provide an electrical power system for a critical load that operates continuously without requiring load deenergization for maintenance or repair, and to provide a high reliability electrical power supply system that is readily expandible to handle any load requirements without significant loss in reliability.

The figure is an operational schematic drawing of an electrical power system embodying this invention.

Referring to the figure, a typical electrical utility power service or source 10 is connected in a high reliability power system designed to furnish substantially uninterruptable, refined power to a critical load 100. The power system has prime mover electrical generating system that comprises two prime mover electrical generating means; an electrically driven generating system that comprises two electrically driven electrical generating means; a control means 60 for connecting either of the prime mover generating means or the utility source to energize either of the electrically driven generating means; a load supply selecting means 80 for connecting either of the electrically driven electrical generating means or the utility source to energize critical load 100; and a secondary power selection means for connecting either the utility source or one of the prime mover electrical generating means to power a typical building load 11. Utility source 10 is connected to the system through a main transformer 12 that comprises a primary winding 12p, a secondary winding 12s that is connectable to energize building load 1, and a secondary winding 12t that is connected to control means 60.

One prime mover electrical generating means uses an engine-generator unit 20 comprising a prime mover power source such as an engine 21, and an electrical generator or alternator 22, and the other prime mover electrical generating means uses a prime mover electrical generator unit 30 comprising a prime mover power source, such as an engine 31, and an electrical generator or alternator 32. The prime mover engines would typically be gas or diesel engines, either reciprocal or turbine type, but any similar prime power source that can furnish the required electrical power can be used. The generator in most instances would be a three phase generator, but can be of any type suitable for a particular application.

One electrically driven electrical generating means uses a motor-generator unit 40 comprising an electrically driven motor 41 that is connected to drive a generator or alternator 42 through a shaft and fly wheel assembly 43 having a high inertial mass to provide a load carrying characteristic sufficient for the application, and similarly, the other electrically driven electrical generating means uses an engine-generator unit 50 comprising an electrically driven motor 51 that is connected to drive a generator or alternator 52 through a fly wheel and shaft assembly 53. The motor-generator units may be any type known in the art, but would typically be three-phase motors driving three-phase generators with the fly wheel assembly having torque mechanisms and an inertial mass sufficient to provide a substantially continuous output upon switching of power supplies to the motor without any significant electrical transients and without any significant frequency variation.

Control means 60 comprises a power sensing means 61 responsive to the output of the operating prime mover generating means for effecting switching from the output of the prime mover generating means to the utility source, means for selecting the output of either of the prime mover generating means, and means for connecting the output from the selected prime mover generating means or utility source to either of the electrically driven generating means or directly to the load.

Power sensing means 61 may be any known sensing system that may be connected to be responsive to the electrical output of the operating prime mover generating means to effect switching from the operating prime mover generating means to the utility source upon failure of the operating prime mover generating means output. The means for selecting the output of either of the engine-generator units comprises a power control switch 62, or a combination of power switches, having three sets of contacts, 62A, 62B, and 62C, that control the connection of the electrical output of engine-generator 22, power source 10, and engine-generator unit 30, respectively, to effect energization of critical load 100 and to energize an environmental load 90. Load 90 would typically be the environment for the critical load including air conditioning, air filtering, emergency lighting, and similar systems. The means for connecting the output to either of the electrically driven generating means comprises a motor control switch 65 comprising three sets of contacts with contacts 65A connected to motor-generator unit 40, 65C connected to motor-generator unit 50, and 65B connectable directly to critical load 100. The control means also comprises a transformer 15, that is optional for most power systems, having a primary winding 15p connectable to utility source 10 or either of the engine-generator units through control switch 62, a secondary winding 15s connected to energize environmental load 90, and a secondary winding 15t connectable to energize the electrically driven generating means.

Load supply selecting means 80 comprises a load sensing means 81 and a load selection switch 82 operable to synchronize the output of the power sources used to energize the load to enable switching between sources without transients. Load sensing means 81 senses the phase and output level of the power supply being prepared to energize the load and the phase and output level of the power supply currently being used to energize the load to operate control switch 82 to switch from one motor-generator unit to the other upon synchronization. Control switch 82 may be manually operated thereby eliminating a need for load sensing means but in this embodiment is automatically operated and comprises a set of contacts 80A connected between motor-generator unit 40 and load 100, a set of contacts 80B connectable between utility source 10 and load 100, and a set of contacts 80C connected between motor-generator unit 50 and load 100. Load supply selecting means 80 includes a means for starting the standby motor-generator unit comprising a starting switch 84 and a starting switch 85 each operable to connect utility source 10 to energize the standby motor-generator unit.

The secondary power selection means is operable to connect building load 11 to be energized either from the utility source or from the electrical output of either of the engine-generator units, and comprises three switches: a switch 91 connected between secondary winding 12s and load 11, a switch 92 connected between engine-generator unit 22 and load 11, and a switch 93 connected between engine-generator unit 30 and load 11. Thus, the power system can operate to energize the building load from the normal standby generator upon failure of the utility source in addition to energizing the full environmental load and the critical load.

The system is operated by energizing the critical load with the electrical output of one of the electrically driven generating means which is energized by the electrical output of one of the prime mover generating means and by connecting the utility source to energize the operating electrically driven generating means substantially immediately upon failure of the electrical output of the prime mover generating means. The prime mover generating means and the electrically driven generating means are alternately operated for selected periods of time with the periods of time selected to provide a minimum probability of failure of any generating means during operation.

The failure of the electrical output of the operating engine-generator unit is sensed by power sensing means 61 which activates control switch 62 to connect the utility source through contacts 62B to energize the operating motor-generator unit and disconnect the operating engine-generator unit by opening either contacts 62A or 62C depending on which engine-generator unit is in use. The switching to the utility source is accomplished substantially immediately but the period of time required to make the switchover is not critical since the inertial mass of the motor-generator system easily carries the load for the switching period without undesirable critical load power supply deviations.

At a completion of the selected period of operation of a motor-generator unit, the switchover to the other, standby, motor-generator unit is accomplished by closing switch 84 or 85 depending on which motor-generator unit is operating to bring the standby motor-generator unit up to operating speed. As the standby motor generator reaches operating speed, load sensing means 81 senses the output of the operating motor-generator unit and the standby motor-generator unit and upon synchronization effects operation of control switch 82 to open contacts 82A or 82C and close the other contacts to connect load 100 to the now operating standby motor-generator unit. After connection of the standby motor-generator unit to the load, motor control switch 65 is activated to switch the output of the operating engine-generator unit to the standby motor-generator unit and the previously operating motor-generator unit is stopped for normal maintenance.

Other sensing systems could be incorporated into the system depending upon the particular load requirements. For example, a failure of the utility service could automatically start up the standby engine-generator unit to have it ready in the event of failure of the one presently in use. Other bypass and startup arrangements and combinations of engine-generator units and motor-generator units could be utilized to assure power for the load and to provide larger power requirements. The system can be automatically or manually operated to the degree necessary for any particular application.

While this specification contains a written description of the invention and the manner and process of making and using it and sets forth the best mode contemplated by me of carrying out my invention, there are many variations, combinations, alterations and modifications of the invention that can be made within the spirit of the invention and the scope of the appended claims.

I claim:

1. A method of using two electrically driven electrical generating means, a prime mover electrical generating means, and an electrical utility power source to energize a load requiring substantially uninterruptable electrical power, said method comprising:

alternately operating the electrical driven generating means for selected periods of time to energize the load with said periods selected to provide a minimum probabiliy of failure of said electrically driven generating means during operation, energizing the electrically driven generating means with the electrical output of the prime mover generating means, after the passage of the selected period of time of operation of one electrically driven generating means, energizing the other electrically driven generating means by connecting it to the utility power source, and switching from the one electrically driven generating means to the other to energize the load and, after said switching, energizing said other electrically driven generating means from the prime mover generating means.

2. A method, according to claim 1, also using a second prime mover electrical generating means and comprising alternately operating the prime mover generating means for selected periods of time with said periods selected to provide a minimum probability of failure of a prime mover generating means during operation; and switching from the operating prime mover generating means to the utility source to energize the operating electrically driven generating means upon failure of the electrical output of the operating prime mover generating means within a selected period of time after said failure with said period selected to be short enough to maintain a substantially unvarying electrical output to the load from the operating electrically driven generating means.

3. A high reliability electrical power system for energizing a load requiring substantially continuous power comprising:

a prime mover electrical generating means, a first and second electrically driven electrical generating means, an electrical utility power source, means for connecting the electrical output of the first electrically driven generating means to energize the load, means for connecting and operating the prime mover generating means to energize the first electrically driven generating means, means for connecting the second electrically driven generating means to be energized by the utility power source, means responsive to the electrical outputs of the first and second electrically driven generating means for switching the load from said first to said second electrically driven generating means upon appropriate operation and synchronization of the electrical outputs of said electrically driven generating means, and means for disconnecting the first electrically driven generating means from the prime mover generating means and for switching the second electrically driven generating means from energization by the utility source to energization by the prime move generating means.

4. A power system according to claim 3 also comprising means responsive to the failure of the electrical output of the prime mover generating means for connecting the utility source to energize the electrically driven generating means energizing the load.

References Cited

UNITED STATES PATENTS 1,770,055    7/1930    Williams _____ 307—65

ROBERT K. SCHAEFER, Primary Examiner

H. J. HOHAUSER, Assistant Examiner

PO-1050
(5/69)

UNITED STATES PATENT OFFICE
CERTIFICATE OF CORRECTION

Patent No. 3,519,843   Dated   July 7, 1970

Inventor(s)  Richard W. Trautman

It is certified that error appears in the above-identified patent and that said Letters Patent are hereby corrected as shown below:

Column 1, line 49, delete "moto-generator" and substitute --motor-generator--; line 65, delete "inertia" and substitute --inertial--; line 72, delete "at" and substitute --as--.

Column 2, line 10, delete "owner" and substitute --power--; line 14, delete "suppply" and substitute --supply--; line 45, delete "1" and substitute --11--.

Column 6, line 20, delete "move" and substitute --mover--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents